Figure 1:
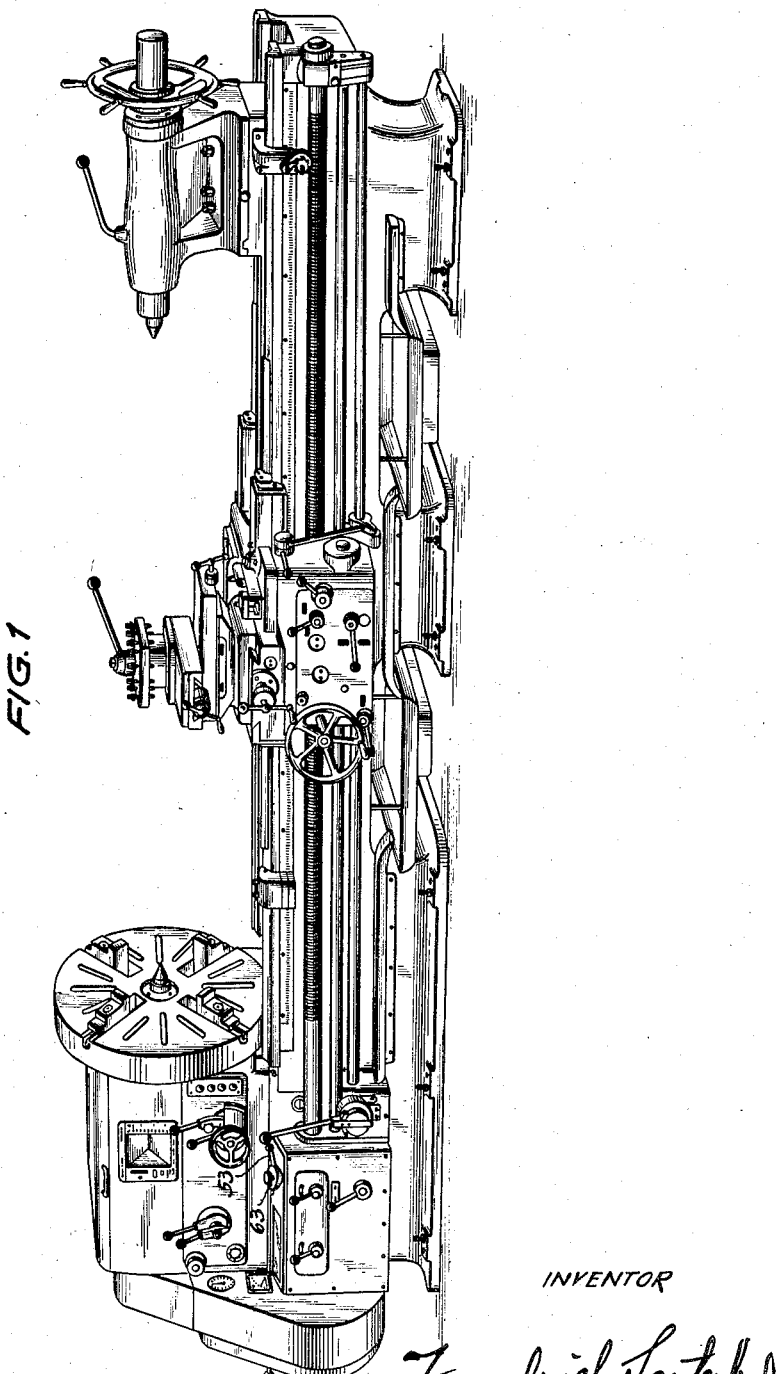

March 18, 1958  F. LAUTENBACH  2,826,930
CONTROL FOR GEAR CHANGE MECHANISM
Filed May 17, 1957  3 Sheets-Sheet 1

INVENTOR
Friedrich Lautenbach
by Mason & Mason

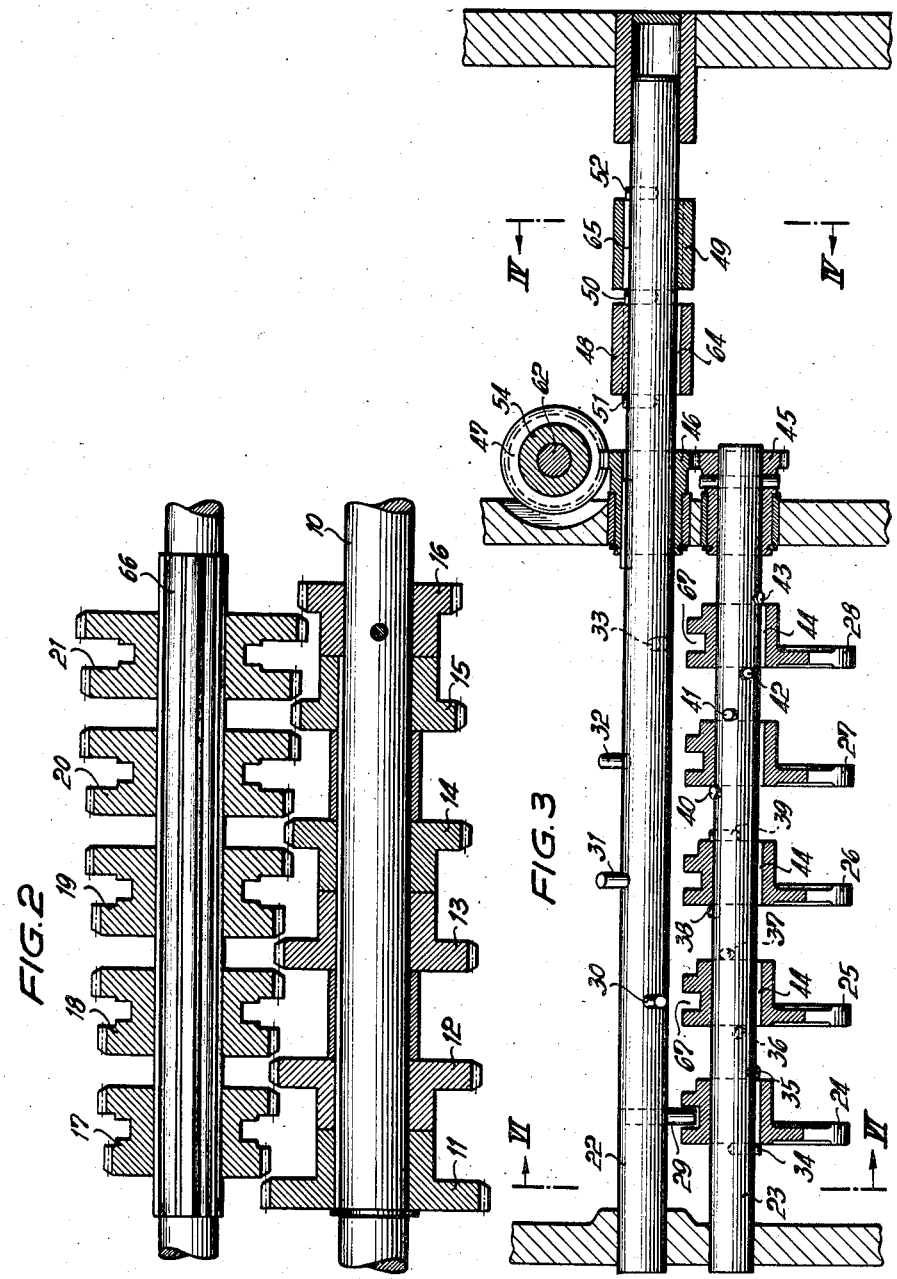

March 18, 1958 F. LAUTENBACH 2,826,930
CONTROL FOR GEAR CHANGE MECHANISM
Filed May 17, 1957 3 Sheets-Sheet 3
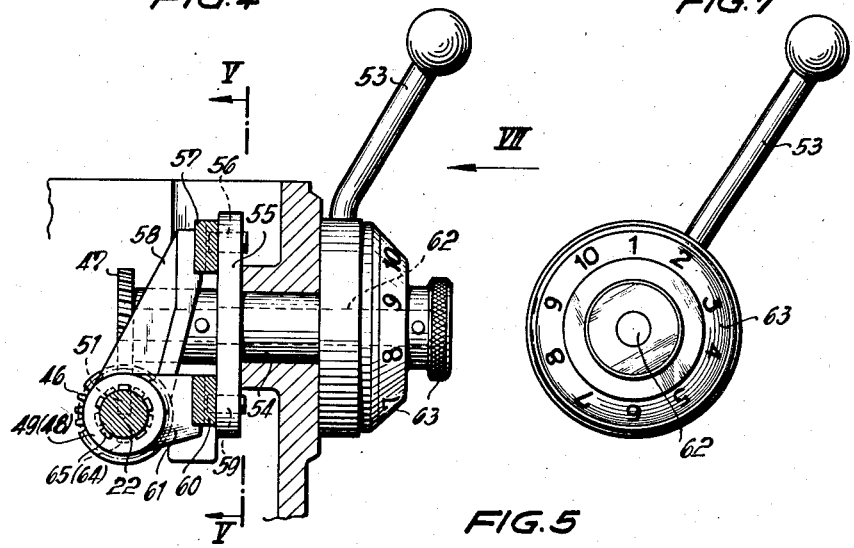
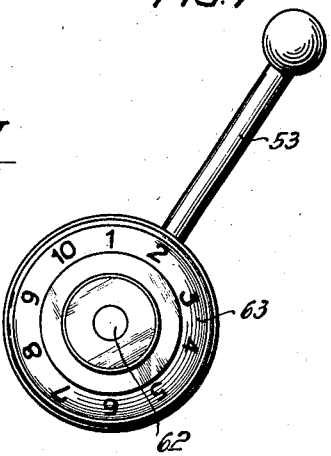
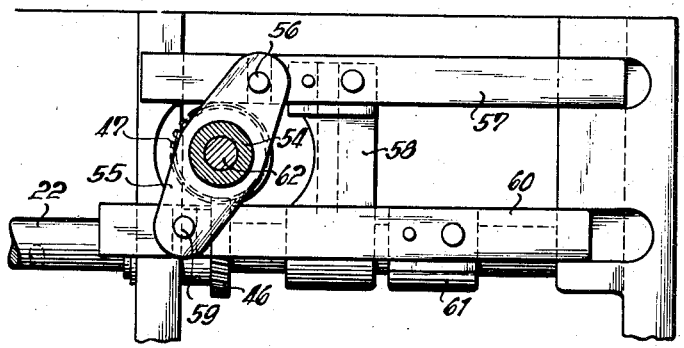
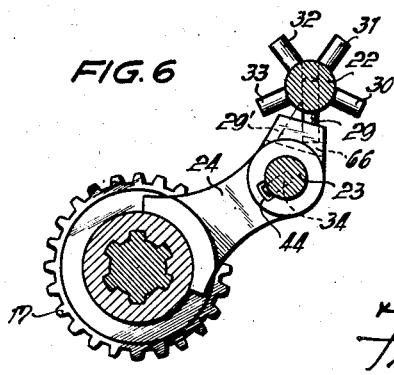
INVENTOR
Friedrich Lautenbach
by Moser & Moser
Attys.

United States Patent Office 2,826,930
Patented Mar. 18, 1958

2,826,930

CONTROL FOR GEAR CHANGE MECHANISM

Friedrich Lautenbach, Limmer, Germany, assignor to H. Wohlenberg Kommanditgesellschaft, Hannover, Germany, a German company Application May 17, 1957, Serial No. 659,815

11 Claims. (Cl. 74—473)

This invention relates to gear change mechanisms, and relates particularly to gear change mechanisms for machine tools, such as lathes, milling machines, thread-cutting machines, saws, drilling machines and paper-cutting machines. The invention is particularly applicable to the change-gears for the feed mechanism of lathes.

It is an object of the invention to provide a gear change mechanism which is of simple construction and which is easy to operate.

It is a further object of the invention to provide such a gear change mechanism for machine tools and particularly for the feed mechanism of lathes.

Thus, according to the invention there is provided in a gear change mechanism in which a selected one of a number of sliding gearwheels is adapted to engage one of a number of gearwheels mounted on a transmission shaft whilst the other sliding gearwheels are adapted to be held in their idle position, a first rotatable spindle, a second rotatable and axially movable spindle, said second spindle being parallel to said first spindle, a gear mounted on said first spindle, a gear mounted on said second spindle, the gear mounted on said first spindle meshing with the gear mounted on said second spindle whereby said first and second spindles rotate together, a plurality of sliding-gearwheel shifting forks, each fork having a hole therein and being slidably mounted on said first spindle with said first spindle extending through the hole in each fork, each fork also having a slot in its periphery, a plurality of pins mounted on said first spindle, successive pins being offset peripherally relative to one another, one of said pins being positioned adjacent each side of each fork respectively, each hole in each fork having an axial groove in its periphery, the cross-sectional dimensions of said grooves being greater than the corresponding dimensions of said pins, all said axial grooves being aligned, a plurality of further pins mounted on said second spindle, said further pins each being located opposite the peripheral slot in one of said forks respectively, said further pins being offset peripherally relative to one another whereby as said second spindle is rotated said further pins successively enter and pass through the peripheral slot which they are located opposite.

The invention also provides in a gear change mechanism, a first shaft, a plurality of fixed gearwheels mounted on said first shaft, a second shaft, a plurality of slidable gearwheels mounted on said second shaft, a first rotatable spindle, a second rotatable and axially movable spindle, said second spindle being parallel to said first spindle, a gear mounted on said first spindle, a gear mounted on said second spindle, the gear mounted on said first spindle meshing with the gear mounted on said second spindle whereby said first and second spindles rotate together, a plurality of forks each engageable with one of said slidable gearwheels respectively, each fork being slidably mounted on said first spindle, means for preventing axial movement in either direction of all of said forks except one, each fork being freed in turn to move successively in one axial direction and then in the other as said first spindle rotates, a plurality of projecting members mounted on said second spindle, said projecting members being offset peripherally relative to one another and each engageable with one of said forks respectively as said second spindle rotates, said engagement occurring when said fork is freed to move axially, axial movement of said second spindle moving that fork which is engaged by its associated projecting member and thereby moving the slidable gearwheel engaged by that fork.

Each fork may have a groove which receives its associated driving element and which is of such length that the fork is in operative connection with the driving element in two successive angular positions of the latter. This makes it possible, whilst retaining the operative connection between driving element and fork, to impart to the spindle carrying the driving elements a partial rotational movement which in the manner described hereinafter is necessary in order to make it possible for one or the other of two sleeves to be connected to the spindle depending on the desired direction of axial displacement of the spindle.

A further feature of the invention is that the second spindle may be displaced by a control lever by means of which, acting through its shaft and a cross-arm, two sleeves arranged on the second spindle are displaced in opposite directions to one another, the said sleeves being provided with axial grooves which are distributed peripherally in such a manner that in each case one of the two sleeves by sliding over a radial pin mounted on the second spindle leaves the latter unaffected, whilst the other sleeve during its sliding movement impinges against a radial pin mounted on the second spindle and thereby moves said second spindle.

In one construction according to the invention, the common spindle with the driving elements for the forks and the pins for coupling one or other sleeve to the spindle, and the second spindle which carries the forks and is provided with locking pins, are adapted to be rotated simultaneously by means of a selector disc. This provides a simple construction and simple operation. The latter is further promoted if the selector disc and the control lever are arranged co-axially. The selector disc is, for example, designed for ten settings, which are associated with five sliding gearwheels which can be displaced selectively from the idle position towards the left or to the right. The control lever can take up a position in which the spindle with the driving elements is changed over to idling and a control position in which the driving elements are displaced towards the left or towards the right.

One embodiment of the subject of the invention as applied to a lathe is illustrated diagrammatically in the accompanying drawings, only those parts which are of immediate importance to the invention being illustrated. It will be self-evident that the gear mechanism can be adapted in a manner known per se for cutting metric threads or for cutting threads in accordance with the inch system, and for cutting right-hand or left-hand screw-threads or for feed. In the drawings:

Fig. 1 is a perspective view of the lathe which is equipped with a gear change mechanism, in accordance with the invention, Fig. 2 is a fragmentary view showing part of the gear mechanism, and more particularly two shafts one of which carries a plurality of gearwheels which are to be driven by one of the sliding gearwheels arranged on the second shaft, Fig. 3 is a longitudinal central sectional view on a larger scale showing the means for pre-selecting and engaging one of the sliding gearwheels, Fig. 4 is a cross-sectional view taken on the line IV—IV of Fig. 3, Fig. 5 is a sectional view taken on the line V—V of Fig. 4, Fig. 6 is a cross-sectional view taken on the line VI—VI of Fig. 3 and Fig. 7 is a view taken in the direction of the arrow VII in Fig. 4.

Referring now to Figure 2, it shows gearwheels 11, 12, 13, 14, 15, 16 of the gear train which are fixed on a transmission shaft 10. Each of these gearwheels may in turn be engaged and driven by one of the sliding gearwheels 17, 18, 19, 20, 21 which are mounted on the shaft 66, the gearwheels 11 and 16 being engageable with the gearwheels 17 and 21 respectively, whilst the gearwheel 12 is engageable by either the gearwheel 17 or the gearwheel 18 and the gearwheels 13, 14 and 15 are likewise engageable by either of the gearwheels 18 or 19, 19 or 20, and 20 or 21 respectively. It is necessary to ensure that at any time only one of the sliding gearwheels 17 to 21 is meshing with one of the gearwheels 11 to 16 and that whilst this is happening the other sliding gearwheels 17 to 21 are held in their idle position.

The means used for this purpose is shown in Fig. 3 and comprises the spindles 22 and 23 which are arranged parallel to one another, the spindle 22 being axially displaceable and rotatable whilst the spindle 23 is only rotatable. The spindle 23 carries control forks 24, 25, 26, 27, 28 (see also Fig. 6) for displacing the sliding gearwheels 17 and 21 by engagement of the lower end of each fork in the peripheral groove in the middle of its associated sliding gearwheels 17 to 21 as shown in Fig. 6. Provided for axial displacement of the forks 24 to 28 are driving elements 29 to 33, which are arranged radially on the spindle 22 and are offset relatively to one another in the peripheral direction. Situated one on each side of each fork 24 to 28 are pairs of radially arranged pins 34 to 43 mounted on the spindle 23. The pins 34 to 43 are off-set by 36° in each case from one another in the peripheral direction, in the particular embodiment being described. The control forks 24 to 28 are each formed with an axial groove 44, said grooves all being in alignment with one another. The pins 34 to 43 always lock four out of the five control forks, and the fifth control fork is only free to be axially displaced in one direction. The angular position of the spindle 23 determines which control fork is displaceable and in which axial direction it may be displaced.

To this there must correspond the angular position of the spindle 22, on which the engagement of a desired one of the driving element 29 to 33 with the associated control fork 24 to 28 depends. Accordingly, the rotary movements of the spindles 22 and 23 are determined positively by a pair of gearwheels 45, 46, the gearwheel 45 being fixed on the spindle 23, whilst the gearwheel 46 may be moved axially on the spindle 22. Advantageously, the gearwheels 45 and 46 are helically toothed, so that they can be jointly driven by a transversely arranged gearwheel 47.

The aforesaid angular adjustment of the spindle 22 provides the pre-selection of the control forks 24 to 28. This angular adjustment also determines the axial direction in which the selected control fork may be moved. This is achieved by the following means. Two sleeves 48, 49 are axially displaceable away from one another on the spindle 22 and, as viewed in Fig. 3, the sleeve 48 is displaceable from the illustrated idle position to the left and the sleeve 49 is displaceable from the illustrated idle position to the right. The pin 50 limits the axial displacement of the sleeve 48 towards the right and the axial displacement of the sleeve 49 towards the left. Situated in axial alignment with the pin 50 are the pins 51 and 52 which in the idle position of the sleeves 48 and 49 are situated adjacent the outer end faces thereof. The sleeves 48 and 49 are each provided on their inner periphery with five axial grooves 64, 65 respectively, (see also Fig. 4), adjacent grooves 64, 65 being radially displaced by 72° in this embodiment. The sleeves 48 and 49 are offset by 36° relatively to one another as can be seen from the relative locations of the grooves 64, 65 in Fig. 4. As a result, when the sleeves 48 and 49 are displaced axially in opposite directions, in each case one of the two sleeves slides over the associated pin 51 or 52 respectively whilst the other sleeve impinges against the pin and as a result moves the spindle 22 axially.

For displacing the sleeves 48 and 49 there is provided a control lever 53 (Figs. 1, 4 and 7) by means of whose hollow shaft 54 (see also Fig. 5) the cross-arm 55 can be rotated to and fro. The pin 56 of the cross-arm 55 engages in a groove in a slide 57. An arm 58 arranged on the latter carries the sleeve 48. A pin 59 arranged on the other end of the cross-member 55 engages in a groove in a slide 60. An arm 61 arranged on the latter carries the sleeve 49. It will be seen from this that when the control lever 53 is turned, the two sleeves 48, 49 are each displaced axially in opposite directions to one another on the spindle 22. In order to bring about displacement of the spindle 22 towards the right or towards the left, the control lever 53 must be turned out of its central positions towards the appropriate side. One of the axial grooves either of the sleeve 48 or the sleeve 49 is thereby aligned with the associated pin 51 or 52 respectively, so that the said sleeve is free to move axially. The associated pin of the other sleeve is at the same time situated between two axial grooves of the said sleeve so that the latter moves the spindle 22 axially.

Since for displacement of the spindle 22 both towards the right and also towards the left the selected one of the driving elements 29 to 33 is to remain in engagement with the associated one of the forks 24 to 28, the slot 67 in each of the forks 24 to 28 is made sufficiently long for the fork to remain in operative connection with the driving element even when the latter turns through 36°, to the position indicated at 29' in Fig. 6.

The parts used for pre-selecting and operating are shown in Figs. 4 to 7. A shaft 62 is arranged coaxially inside the hollow shaft 54 of the control lever 53. One end of the shaft 62 carries the gearwheel 47, its other end a selector disc 63 (Figs. 1, 4 and 7). In accordance with the illustrated number of five forks 24 to 28 and associated driving elements 29 to 33, which are adapted to be moved out of their idle position either towards the right or towards the left, the selector disc 63 is designed for ten settings. The control lever 53 has two positions, namely the idle position and the position in which it displaces the spindle 22.

According to the arrangement shown in Fig. 2, sliding gearwheels 17 to 21 are all situated on the same shaft 66. The invention also permits of an arrangement wherein the sliding gearwheels are situated on different shafts. The constructional outlay can be reduced by omitting one half of the cross-arm 55, pin 56, slide 57, arm 58, sleeve 48 and the grooves 64 and the sleeve 49 and also the pin 51; in this case the control lever 53 has three positions; i. e. it must be pivoted from the middle or idle position towards the right or towards the left depending on the direction in which the selected sliding gear must move to engage the associated gearwheel.

What I claim is:

1. In a gear change mechanism in which a selected one of a number of sliding gearwheels are adapted to engage one of a number of gearwheels mounted on a transmission shaft while the other sliding gearwheels are adapted to be held in their idle position, a first rotatable spindle, a second rotatable and axially movable spindle, said second spindle being parallel to said first spindle, a gear mounted on said first spindle, a gear mounted on said second spindle, the gear mounted on said first spindle meshing with the gear mounted on said second spindle whereby said first and second spindles rotate together, a plurality of sliding-gearwheel shifting forks, each fork having a hole therein and being slidably mounted on said first spindle with said first spindle extending through the hole in each fork, each fork also having a slot in its periphery, a plurality of pins mounted on said first spindle, successive pins being offset peripherally relative to one another, one of said pins being positioned adjacent each side of each fork respectively, each hole in each fork having an axial groove in its periphery, the cross-sectional dimensions of said grooves being greater than the corresponding dimensions of said pins, all said axial grooves being aligned, a plurality of further pins mounted on said second spindle, said further pins each being located opposite the peripheral slot in one of said forks respectively, said further pins being offset peripherally relative to one another whereby as said second spindle is rotated said further pins successively enter and pass through the peripheral slot which they are located opposite.

2. A gear change mechanism according to claim 1, further comprising a shaft, a control lever mounted on said shaft for rotating said shaft, a cross-arm mounted on said shaft and rotatable therewith, first and second sleeves mounted on said second spindle, means for preventing axial movement of said first sleeve on said second spindle over a first predetermined range of angular positions of said second spindle, means for preventing axial movement of said second sleeve on said second spindle over a second predetermined range of angular positions of said second spindle which is different from said first predetermined range, and means coupling said first and second sleeves to said cross-arm for movement of said sleeves with rotation of said cross-arm.

3. A gear change mechanism according to claim 2, in which said first and second sleeves each have a plurality of axial grooves distributed around their inner periphery, the means for preventing axial movement of each sleeve consisting of radial pins fixed in said second spindle, the cross-sectional dimensions of each groove being greater than the corresponding dimension of a radial pin whereby a sleeve can slide over a pin when a groove in the sleeve is aligned with that pin.

4. A gear change mechanism according to claim 2, further comprising a rotary selector disc in driving engagement with said first and second spindles.

5. A gear change mechanism according to claim 4, wherein said selector disc is mounted coaxially with said control lever.

6. In a gear change mechanism, a first shaft, a plurality of fixed gearwheels mounted on said first shaft, a second shaft, a plurality of slidable gearwheels mounted on said second shaft, a first rotatable spindle, a second rotatable and axially movable spindle, said second spindle being parallel to said first spindle, a gear mounted on said first spindle, a gear mounted on said second spindle, the gear mounted on said first spindle meshing with the gear mounted on said second spindle whereby said first and second spindles rotate together, a plurality of forks each engageable with one of said slidable gearwheels respectively, each for being slidably mounted on said first spindle, means for preventing axial movement in either direction of all of said forks except one, each fork being freed in turn to move successively in one axial direction and then in the other as said first spindle rotates, a plurality of projecting members mounted on said second spindle, said projecting members being offset peripherally relative to one another and each engageable with one of said forks respectively as said second spindle rotates, said engagement occurring when said fork is freed to move axially, axial movement of said second spindle moving that fork which is engaged by its associated projecting member and thereby moving the slidable gearwheel engaged by that fork.

7. A gear change mechanism according to claim 6, in which each fork has a slot in its periphery in which the projecting member which engages said fork enters, the length of said slot being such that the projecting member lies within it in the two rotational positions of said second spindle when said fork is free to move in one axial direction and is free to move in the other axial direction respectively.

8. A gear change mechanism according to claim 6, further comprising a shaft, a control lever mounted on said shaft for rotating said shaft, a cross-arm mounted on said shaft and rotatable therewith, first and second sleeves mounted on said second spindle, means for preventing axial movement of said first sleeve on said second spindle over a first predetermined range of angular positions of said second spindle, means for preventing axial movement of said second sleeve on said second spindle over a second predetermined range of angular positions of said second spindle which is different from said first predetermined range, and means coupling said first and second sleeves to said cross-arm for movement of said sleeves with rotation of said cross-arm.

9. A gear change mechanism according to claim 8, in which said first and second sleeves each have a plurality of axial grooves distributed around their inner periphery, the means for preventing axial movement of each sleeve consisting of radial pins fixed in said second spindle, the cross-sectional dimensions of each groove being greater than the corresponding dimension of a radial pin whereby a sleeve can slide over a pin when a groove in the sleeve is aligned with that pin.

10. A gear change mechanism according to claim 8, further comprising a rotary selector disc in driving engagement with said first and second spindles.

11. A gear change mechanism according to claim 10, wherein said selector disc is mounted coaxially with said control lever.

References Cited in the file of this patent

UNITED STATES PATENTS

| | | |
|---|---|---|
| 1,687,139 | Neff | Oct. 9, 1928 |
| 2,355,623 | Bullard | Aug. 15, 1944 |
| 2,748,643 | Irtenkauf | June 5, 1956 |

FOREIGN PATENTS

| | | |
|---|---|---|
| 61,057 | Switzerland | May 20, 1912 |
| 936,826 | France | Feb. 23, 1948 |
| 470,961 | Italy | Apr. 30, 1952 |

UNITED STATES PATENT OFFICE

CERTIFICATE OF CORRECTION

Patent No. 2,826,930

March 18, 1958

Friedrich Lautenbach

It is hereby certified that error appears in the above numbered patent requiring correction and that the said Letters Patent should read as corrected below.

In the heading to the printed specification, between lines 6 and 7, insert the following:

-- Claims priority, application Germany May 19, 1956 --.

Signed and sealed this 5th day of August 1958.

(SEAL)
Attest:

KARL H. AXLINE
Attesting Officer

ROBERT C. WATSON
Commissioner of Patents